July 15, 1941.   H. J. SMITH   2,249,302
FISHING ROD HOLDER
Filed Aug. 20, 1940   2 Sheets-Sheet 1

Inventor
Henry J. Smith
By Clarence A. O'Brien
Attorney

July 15, 1941.  H. J. SMITH  2,249,302
FISHING ROD HOLDER
Filed Aug. 20, 1940   2 Sheets-Sheet 2
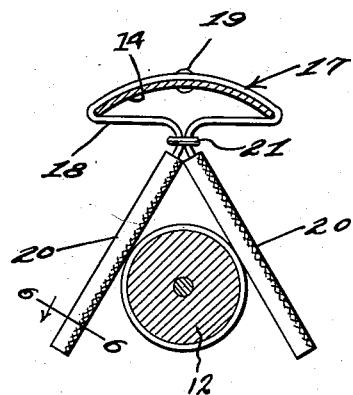
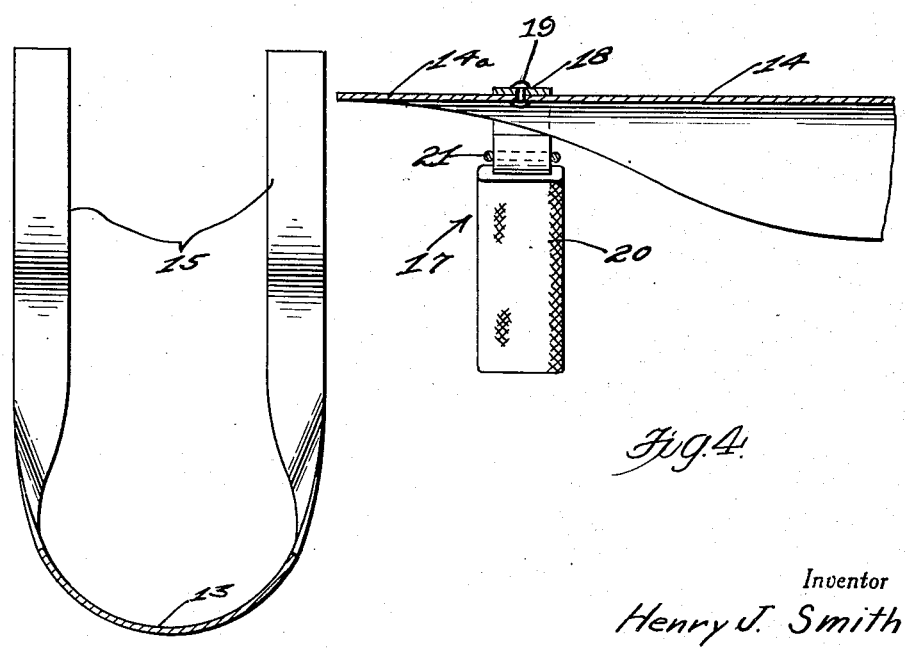
Inventor
Henry J. Smith
By Clarence A. O'Brien
Attorney Patented July 15, 1941

2,249,302

UNITED STATES PATENT OFFICE 2,249,302

FISHING ROD HOLDER

Henry J. Smith, Great Neck, N. Y.

Application August 20, 1940, Serial No. 353,414

2 Claims. (Cl. 248—42)

This invention relates to holders for fishing rods and an object of the invention is to provide a holder of this character characterized by simplicity of construction and fewness of parts; and which can also be readily mounted where desired on a boat or other support for holding the rod in a positive and efficient manner.

The invention together with its objects and advantages will be best understood from a study of the following description taken in connection with the accompanying drawings wherein:

Figure 3 is a sectional view taken substantially on the line 3—3 of Figure 1.

Figure 2:
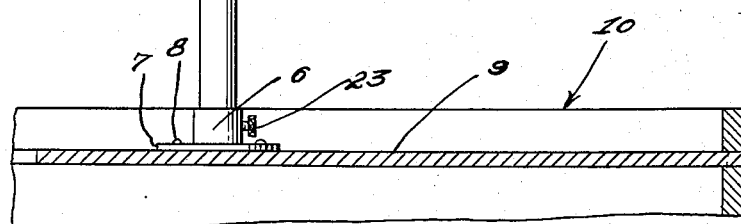
Figure 2 is a top plan view of the holder.
Figure 6:
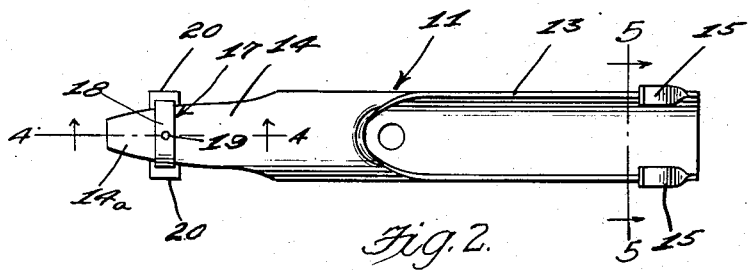

Figures 4 and 5 are detail sectional views taken substantially on the lines 4—4 and 5—5, respectively, of Figure 2, and Figure 6 is a detail sectional view taken substantially on the line 6—6 of Figure 3.

Referring more in detail to the drawings it will be seen that in the preferred embodiment thereof the holder comprises a post or standard 5 that is adapted to have an end thereof inserted in a suitable socket 6 provided therefor.

Figure 1:
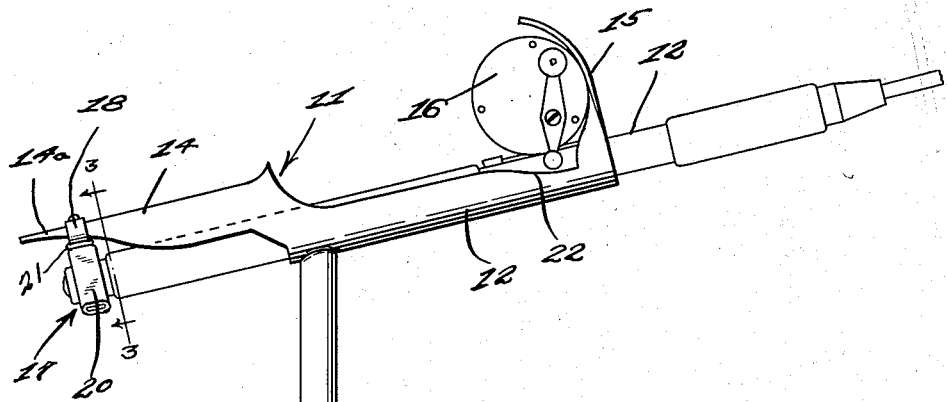
Figure 1 is a side elevational view illustrating the application of the invention.

The socket 6 is provided with an apertured base flange 7 through the medium of which and suitable fastening elements 8 the socket may be readily secured to any selected part 9 of a boat fragmentarily shown in Figure 1 and indicated generally by the reference numeral 10, or to any other suitable support.

On the upper end thereof the standard 5 is provided with a head 11 that is disposed on the diagonal, or in other words at a suitable angle to the horizontal.

The head 11 forms a socket for the reception of the handle 12 of a fishing rod fragmentarily shown in Figure 1 of the drawings.

The head 11 is substantially of tubular form, opened at its respective opposite ends, and cut, shaped and dimensioned to provide an upwardly opening end 13 substantially channel-shaped in cross section and a downwardly opening end 14 that is also substantially channel-shaped in cross-section; the handle 12 of the fishing rod being accommodated in the channel sections 13 and 14 in the manner clearly shown in Figure 1.

At the terminal of the end 13 thereof the head 11 has the sides of the channel part 13 thereof formed integrally with upstanding prongs 15 that are curved as shown to complement the periphery of the reel 16 mounted on the handle 12.

The walls of the channel end 14 of the head 11 are somewhat tapered to form a relatively narrow extension 14a on which is secured a friction clamp 17.

The friction clamp 17 as best shown in Figure 3 is formed from a single length of strap metal bent to form an eye portion 18 that is sleeved on the extension 14a and is positively secured thereon through the medium of a rivet or other fastening element 19; and a pair of divergent resilient jaws 20 that extend downwardly from the eye 18.

At the point of junction between the jaws 20 and the eye 18 said jaws are held in contact with one another and in a manner to completely close the eye 18 through the medium of a suitable loop 21 of metal or other suitable material as shown.

The jaws 20 are adapted to clamp therebetween the free end of the fishing rod handle 12 as shown, and in order to prevent the scratching or otherwise marring of said end of the handle 12 jaws 20 are preferably provided with protective coverings of rubber or other suitable material as shown.

Obviously the jaws 20 engaging the end of the handle 12 as shown, and the prongs 15 disposed relative to the reel 16 as shown, the fishing rod is held in the head 11 against movement longitudinally or axially relative to the head 11 in a positive and efficient manner, and in a manner as will not permit the rod to be easily displaced.

The walls of the channel end 13 of head 11, at the point where said walls merge with the base of the prongs 15, are of suitable edge contour, and as indicated at 22 so as to clear the operating knob of the reel 16, and thus permit complete and proper seating of the handle 12 of the rod in the channel end or part 13 of the head 11.

It is believed that the manner of positioning the rod on the holder is apparent, but such may be briefly explained as follows: The free end of the handle 12 is passed through the socket into the end 14 of the socket to engage the terminal of the handle between the jaws 20 of the clamp or clip 17, after which the handle 12 is permitted to rotate in a counter-clockwise direction to move to a seated position in the part 13 of the head or socket 11.

To remove the handle 12 from the head or socket 11 the operation just described is substantially completely reversed.

It is thought that the simplicity of a fishing rod holder embodying the features of the present invention, as well as the many advantages of such a holder, will be clear from the foregoing to those skilled in the art.

It is also to be understood that in use the standard 5 and associated parts may be rotated towards the right or left to the position desired and secured in the selected position through the medium of a set screw 23 that threads through an opening in the wall of the socket 6 to bind against the standard 5. Also through the medium of the set screw 23 the lower end of the standard 5 is held securely within the socket.

Having thus described the invention what is claimed as new is:

1. A fishing rod holder comprising an upright, a lateral elongated head having an intermediate part connected with the upper end of the upright, said head including an elongated channel-shaped part opening upwardly and extending from the upright to the forward end of the head, said channel-shaped part receiving a portion of a handle of a rod, an upwardly extending member at the forward end of the channel-shaped part forming a rest for a part of a reel attached to the rod, an inverted channel-shaped portion of elongated form extending rearwardly from the rear end of the first channel-shaped part, the junction of the two channel-shaped parts forming a circular portion for the passage of a part of the handle and spring jaws supported from the rear end of the inverted channel-shaped part and extending downwardly for engaging the free end of the handle.

2. A fishing rod holder comprising an upright, a laterally extending head having an intermediate portion connected to the upper end of the upright, said head including an intermediate tubular part, a forwardly extending channel-shaped part of considerable length and opening upwardly and an inverted channel-shaped part extending rearwardly from the tubular part and terminating in a reduced portion, a clip connected with the reduced part and including a pair of jaw members extending downwardly for engaging the free end of a handle of a rod, said handle passing through the two channel-shaped parts and the tubular portion, upwardly and rearwardly curving prongs connected with the front end of the first channel-shaped part for engaging a reel on the handle, the side walls of the first channel-shaped part having recesses therein for the passage of the handle of the reel.

HENRY J. SMITH.